(12) United States Patent
Plotnikov et al.

(10) Patent No.: US 10,884,744 B2
(45) Date of Patent: Jan. 5, 2021

(54) SYSTEM AND METHOD OF LOOP VECTORIZATION BY COMPRESSING INDICES AND DATA ELEMENTS FROM ITERATIONS BASED ON A CONTROL MASK

(71) Applicant: Intel Corporation, Santa Clara, CA (US)

(72) Inventors: Mikhail Plotnikov, Nizhny Novgorod (RU); Andrey Naraikin, Nizhny Novgorod (RU); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 15/681,303

(22) Filed: Aug. 18, 2017

(65) Prior Publication Data

US 2018/0032342 A1    Feb. 1, 2018

Related U.S. Application Data

(63) Continuation of application No. 13/994,549, filed as application No. PCT/RU2012/000794 on Sep. 28, 2012, now Pat. No. 9,740,493.

(51) Int. Cl.
*G06F 9/38* (2018.01)
*G06F 9/30* (2018.01)
*G06F 8/41* (2018.01)

(52) U.S. Cl.
CPC .............. *G06F 9/38* (2013.01); *G06F 8/4441* (2013.01); *G06F 8/452* (2013.01); *G06F 9/30018* (2013.01); *G06F 9/30036* (2013.01)

(58) Field of Classification Search
CPC .... G06F 9/38; G06F 9/30018; G06F 9/30036; G06F 8/452; G06F 15/8084
See application file for complete search history.

(56) References Cited

U.S. PATENT DOCUMENTS

| 4,873,630 A | 10/1989 | Rusterholz et al. |
| 5,901,318 A * | 5/1999 | Hsu .......................... G06F 8/452 717/161 |

(Continued)

FOREIGN PATENT DOCUMENTS

| CN | 101196825 | 6/2008 |
| CN | 101540672 | 9/2009 |
| CN | 101627394 | 1/2010 |

OTHER PUBLICATIONS

Hennessy and Patterson, Computer Architecture A Quantitative Approach, 2007, Morgan Kaufmann, 4th edition, 69 pages.*

(Continued)

*Primary Examiner* — Jyoti Mehta
(74) *Attorney, Agent, or Firm* — Hanley, Flight & Zimmerman, LLC

(57) ABSTRACT

Loop vectorization methods and apparatus are disclosed. An example method includes generating a first control mask for a set of iterations of a loop by evaluating a condition of the loop, wherein generating the first control mask includes setting a bit of the control mask to a first value when the condition indicates that an operation of the loop is to be executed, and setting the bit of the first control mask to a second value when the condition indicates that the operation of the loop is to be bypassed. The example method also includes compressing indexes corresponding to the first set of iterations of the loop according to the first control mask.

6 Claims, 11 Drawing Sheets

(56) References Cited

U.S. PATENT DOCUMENTS

| | | | | |
|---|---|---|---|---|
| 5,903,769 | A | * | 5/1999 | Arya .................. G06F 15/8084 712/5 |
| 2004/0098556 | A1 | | 5/2004 | Buxton et al. |
| 2005/0268075 | A1 | | 12/2005 | Caprioli et al. |
| 2008/0092125 | A1 | | 4/2008 | Archambault et al. |

OTHER PUBLICATIONS

European Patent Office, "Examination Report," issued in connection with Application No. 12 885 716.6, dated Feb. 22, 2017 (3 pages).

Hennessy and Patterson, Computer Architecture A Quantitative Approach, 2007, Morgan Kaufmann, 4th edition, 74 pages.

David Patterson, Lecture 7 Memory Hierarchy-3Cs and 7 ways to reduce misses, 1996, 52 pages, [retrieved from the Internet on Jan. 13, 2016], retrieved from URL <www.cs.berkeley.edu/-pattrsn/252F96/Lecture07.pdf>.

Fung et al, Thread Block Compaction for efficient SIMT control flow, Feb. 2011, HPCA 2011 IEEE, 978 1 4244 9435/4/11, 14 pages.

The International Searching Authority, "The International Search Report and the Written Opinion of the International Searching Authority," issued in connection with Application No. PCT/RU2012/000794, dated Jun. 14, 2013, 5 pages.

United States Patent and Trademark Office, "Non-Final Office Action," issued in connection with U.S. Appl. No. 13/994,549, dated Sep. 22, 2016, 29 pages.

United States Patent and Trademark Office, "Notice of Allowance," issued in connection with U.S. Appl. No. 13/994,549, dated Apr. 18, 2017, 19 pages.

The International Searching Authority, "International Preliminary Report on Patentability," issued in connection with Application No. PCT/RU2012/000794, dated Mar. 31, 2015, 4 pages.

Wikipedia, "Conditional (computer programming)", at https://en.wikipedia.org/wiki/Conditional_(computer_programming), retrieved on Jul. 12, 2018 (6 pages).

State Intellectual Property Office of China, "Office Action," issued in connection with Foreign Counterpart Application No. 201280075455.9, dated Jan. 17, 2017 (12 pages, Including English Translation).

* cited by examiner

```
800
802──▶ // begin loop
804──▶ i = 0;                              // initialize values
806──▶ v_index=VL-1:VL-2:...:1:0           // initial vector of indexes
808──▶ v_VL=VL:VL:...:VL                   // increment for vector of indexes
810──▶ n = 0;                              // number of accumulated elements
812──▶ do {
814────▶ k1=condition(i+VL-1:i);           // generate control mask
816────▶ v1{k1}=vector_load(data(i+VL-1:i));   // load data
818────▶ v2=compress(v1,k1);               // compress v1 to v2 using k1 control mask
820────▶ v3=compress(v_index,k1);          // compress indexes for storing results
822────▶ A[n+VL-1:n]=vector_store(v2);     //store data in acc array
824────▶ B[n+VL-1:n]=vector_store(v3);     // preserve indexes
826────▶ n=n+popcnt(k1);                   // number of elements accumulated in this iteration
828────▶ i+=VL;                            // increment loop counter
830────▶ v_index+=v_VL;                    // increment index vector
832────▶ if (n>=VL) {
834──────▶ v1=vector_load(A[VL-1:0]);// load accumulated data to register
836──────▶ v3=vector_load(B[VL-1:0]);// load indexes for result to register
838──────▶ v2=computation(v1);             // non-masked computation over data
840──────▶ scatter(v2,v3,result);          // scatter v2 with indexes v3 to result
842──────▶ A[VL-1:0]=A[2*VL-1:VL];         // shift remaining elements
844──────▶ B[VL-1:0]=B[2*VL-1:VL];         // to start of static arrays
846──────▶ n=n-VL;                         // start new accumulation
         }
848──▶ } while (i<N);                      // continue until input stream finished
       //start remainder computations
850──▶ k2=generate_mask(n);                // generate mask with n first 1s
852──▶ v1{k2}=vector_load(A[VL-1:0]);      // load accumulated data
854──▶ v3{k2}=vector_load(B[VL-1:0]);      // load indexes for storing result
856──▶ v2{k2}=computation(v1);             // masked remainder computation over left data
858──▶ scatter(k2,v2,v3,result);           // scatter v2 with indexes v3 to result under
                                           // k2 write-mask
       // end loop
```

FIG. 8

```
1100
1102 → // begin loop
1104 → i = 0;                          // initialize values
1106 → v_index=VL-1:VL-2:...:1:0       // initial vector of indexes
1108 → v_VL=VL:VL:...:VL               // increment for vector of indexes
1110 → n = 0;                          // number of accumulated elements
1112 → do {
1114 →     k1=condition(i+VL-1:i);     // generate control mask
1116 →     v3=compress(v_index,k1);    // compress indexes for storing results
1118 →     B[n+VL-1:n]=vector_store(v3);  // preserve indexes
1120 →     n=n+popcnt(k1);             // number of elements accumulated in this iteration
1122 →     i+=VL;                      // increment loop counter
1124 →     v_index+=v_VL;              // increment index vector
1126 →     if (n>=VL) {
1128 →         v3=vector_load(B[VL-1:0]);// load indexes for gathering data
                                          // and storing result to register
1130 →         gather(v1,v3,data);     // gather data for indexes in v3 into v1
1132 →         v2=computation(v1);     // non-masked computation over data
1134 →         scatter(v2,v3,result);  // scatter v2 with indexes v3 to result
1136 →         B[VL-1:0]=B[2*VL-1:VL]; // to start of static arrays
1138 →         n=n-VL;                 // start new accumulation
           }
1140 → } while (i<N);                  // continue until input stream finished
       //start remainder computations
1142 → k2=generate_mask(n);            // generate mask with n first 1s
1144 → v3{k2}=vector_load(B[VL-1:0]);  // load indexes for gathering data and
                                         // storing result
1146 → Gather(k2,v1,v3,data);          // gather data for indexes v3 into v1 under
                                         // k2 write-mask
1148 → v2{k2}=computation(v1);         // masked remainder computation over left data
1150 → scatter(k2,v2,v3,result);       // scatter v2 with indexes v3 to result under
                                         // k2 write-mask
       // end loop
```

FIG. 11

SYSTEM AND METHOD OF LOOP VECTORIZATION BY COMPRESSING INDICES AND DATA ELEMENTS FROM ITERATIONS BASED ON A CONTROL MASK

RELATED APPLICATIONS

This patent arises from a continuation of U.S. patent application Ser. No. 13/994,549, filed on Sep. 19, 2013, and entitled "SYSTEM AND METHOD OF LOOP VECTORIZATION BY COMPRESSING INDEXES AND DATA ELEMENTS FROM ITERATIONS BASED ON A CONTROL MASK," which claims priority to Patent Cooperation Treaty Application No. PCT/RU2012/000794, which was filed on Sep. 28, 2012. Priority to U.S. patent application Ser. No. 13/994,549 and PCT Application No. PCT/RU2012/000794 is hereby claimed. U.S. application Ser. No. 13/994,549 and PCT Application No. PCT/RU2012/000794 are hereby incorporated herein by reference in their entireties.

FIELD OF THE DISCLOSURE

The present disclosure relates generally to computing platforms and, more particularly, to loop vectorization methods and apparatus.

BACKGROUND

Some computing platforms attempt to improve machine level execution of code by translating the code according to vectorization techniques. For example, original code corresponding to an iterative loop may be converted into vectorized code to better utilize resources of the computing platform.

BRIEF DESCRIPTION OF THE DRAWINGS

FIG. 8 is pseudo-code representative of an example vectorization of the loop of FIG. 1 generated by the example loop vectorizer of FIG. 3.

FIG. 11 is pseudo-code representative of an example vectorization of the loop of FIG. 1 generated by the example loop vectorizer of FIG. 9.

DETAILED DESCRIPTION

Figure 1:
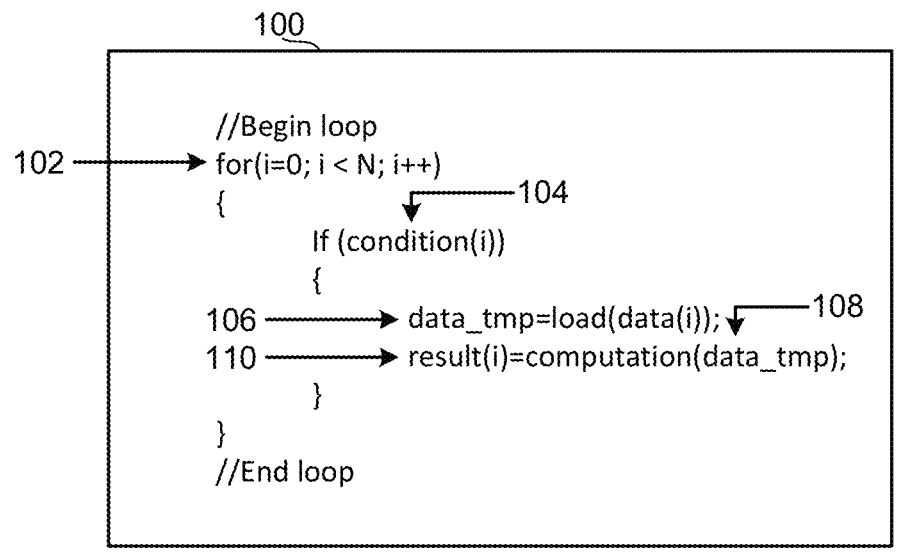
FIG. 1 is pseudo-code representative of an example loop.

Original code to be compiled and executed by a processor may include one or more iterative loops. In such instances, data is loaded into one or more registers, one or more operations are performed on the data, and resulting information is stored in memory. Computing platforms can improve machine level execution of the original code via loop vectorization. In particular, execution time of the loop can be substantially reduced by vectorizing the loop such that multiple iterations of the loop are executed simultaneously. Iterations of a loop executing substantially simultaneously are said to be executing in parallel. Loop vectorization includes loading data for multiple iterations of a loop into a single vector (e.g., implemented via a vector register) and performing the operations of the loop on the entire vector. As a result of the vector including the data of multiple iterations of the loop, execution of the loop operations on the entire vector results in multiple iterations of the loop being executed in parallel.

Loop vectorization is sometimes implemented in a system having registers that are larger (e.g., according to a particular architecture or hardware configuration of the system) than a data type used by original code (e.g., a loop) to be executed via the registers. For example, a loop to be executed on hardware having 128-bit registers may have been written or designed using 32-bit integers. To vectorize such a loop, data associated with a first iteration of the loop is placed into lower bits of a first one of the registers and data associated with a second, later iteration of the loop (e.g., subsequent in a progression of iterations defined in a loop definition) is loaded into higher bits of the first register. In such instances, the number of iterations of the loop that can be simultaneously executed is equal to a ratio of the register size (e.g., hardware) to a size of the data type to be loaded and operated on within the loop (e.g., software). For example, if the original code of the loop loads a 32-bit integer into a variable and the loop is to be executed on hardware having 128-bit registers, the integer to be loaded during the first iteration of the loop is loaded into the first 32-bits of the 128-bit register. Further, the integer to be loaded during the second iteration of the loop is loaded into the second 32-bits of the register. Further, the integer to be loaded during the third iteration is loaded into the third 32-bits of the register. Further, the integer to be loaded during the fourth iteration of the loop is loaded into the fourth 32-bits of the register. With the data associated with multiple iterations of the loop loaded into a single register, the corresponding computation(s) or operation of the loop are performed on the entire register. The results from each of the four 32-bit register sections are stored in appropriate memory locations. Thus, in such instances, the execution time of the loop is decreased by approximately a factor of four (e.g., not taking into account overhead incurred by the vectorization process).

In some loops, a condition is evaluated at the start of each iteration of the loop and the remaining commands of the loop are performed only if the condition is met. FIG. 1 shows example pseudo-code for such a loop 100. The example loop 100 of FIG. 1 includes a loop definition or statement 102 and a condition 104 to be evaluated at an onset of iterations of the loop 100. After the loop 100 is initialized, the condition 104 is evaluated. For purposes of illustration and brevity, when the condition to be checked evaluates to a value that causes a subsequent computation in the code to be executed, that value is referred to herein as 'true.' Further, for purposes of illustration and brevity, when the condition to be checked evaluates to a value that causes a subsequent computation in the code not to be executed, that value is referred to herein as 'false.' Thus, if the condition 104 evaluates to true for a particular iteration, a data load operation 106 is executed, a computation operation 108 is performed using the data loaded during the load operation 106, and a result of the computation operation 108 is stored via a write operation 110. Alternatively, if the condition 104 evaluates to false for a particular iteration, the operations 106, 108 and 110 of the loop 100 are not executed for that iteration and the loop 100 jumps to the subsequent iteration (if any iterations remain). In other words, when the condition 104 evaluates to false, the operations 106, 108 and 110 are bypassed.

Figure 2:
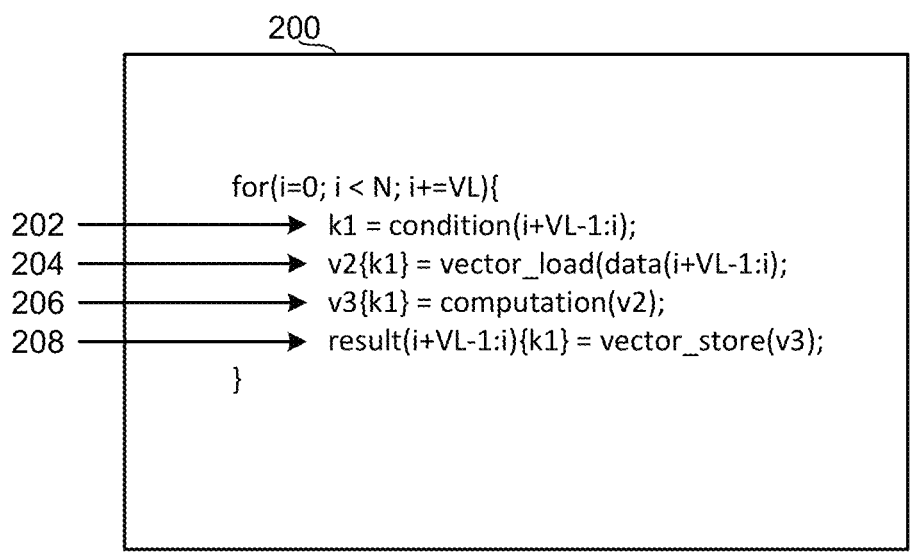
FIG. 2 is pseudo-code representative of a known technique for vectorizing the example loop of FIG. 1.

A known technique for vectorizing the example loop 100 of FIG. 1 is shown in the pseudo-code 200 of FIG. 2. As described below, the known technique of FIG. 2 evaluates the condition 104 for the different iterations of the loop 100 to be vectorized and generates a write-mask based on results of the respective evaluations of the condition 104 (at reference numeral 202 of FIG. 2). In the pseudo-code 200 of FIG. 2, the write-mask is represented by a variable 'k1.' Further, the value 'VL' represents a number of elements that the registers can include (e.g., the vector length of the registers in bytes, bits, words, etc.). In the example of FIG. 2, bits of the write-mask 'k1' are set to a logical one (1) when the condition 104 evaluates to true. Further, bits of the write-mask 'k1' are set to a logical zero ('0') when the condition 104 evaluates to false. In the pseudo-code 200 of FIG. 2, data for each iteration is loaded into a vector (v) (at reference numeral 204 of FIG. 2). Further, operations 106-110 of the loop 100 of FIG. 1 are performed on the entire vector simultaneously (at reference numeral 206 of FIG. 2). The pseudo-code 200 uses the write-mask 'k1' to only store results of the loop operations 106-110 in memory for the loop iterations in which the condition 104 evaluated to true (at reference numeral 208 of FIG. 2). For example, the results of the loop operations 106-110 are only preserved for iterations having a logical one (1) in the corresponding bit of the write-mask 'k1.'

Notably, using the known technique represented by the pseudo-code 200 of FIG. 2, even for the iterations of the loop for which the condition 104 evaluates to false, operations 106-110 of the loop 100 are performed on the data (although the results are not stored in memory). While the write-mask 'k1' of the known technique of FIG. 2 ensures that only appropriate data is stored in memory, this technique leads to performance of unnecessary computations, which negates a significant portion of the improvement (e.g., in execution time) provided by the vectorization of the loop 100. As such, the known vectorization technique of FIG. 2 includes inefficiencies.

The efficiency of a loop vectorization such as that shown in FIG. 2 can be estimated as the following ratio: <number of elements for which the condition is true>/<number of elements for which computation was executed>. This ratio can be nearly zero for loops having sparse computations (e.g., loops in which a condition preceding operation(s) is rarely satisfied (e.g., rarely evaluates to true)). For such loops, the known vectorization technique illustrated in FIG. 2 is highly inefficient because results of a significant portion of the performed computations are not actually stored in memory and, thus, were unnecessarily executed. Some known techniques attempt to avoid unnecessary computations by adding an early-out check that interrupts execution of the computations when all remaining bits of the write-mask are zeros. However, this additional check adds overhead to the vectorization of the loop, which also decreases the performance improvement provided from the loop vectorization.

Example methods, apparatus, and/or articles of manufacture disclosed herein provide efficient loop vectorization mechanisms. In particular, examples disclosed herein improve performance of loop vectorization by increasing efficiency of system resources and preventing execution of unnecessary loop operations (e.g., operations that generate data that will not be stored). As described in greater detail below, examples disclosed herein generate a control mask by evaluating a condition of a loop for multiple iterations of the loop and setting bits of the control mask according to the results of those evaluations in the control mask. Examples disclosed herein use the control mask to compress data corresponding to the loop iterations in the registers. For instance, examples disclosed herein compress the data by removing data elements from the registers for which the corresponding bit in the control mask is a logical zero (0). Examples disclosed herein store the remaining data elements in an array. Examples disclosed herein process additional loop iterations in a similar manner to populate the array with data elements until a number of elements in the array reaches a threshold (e.g., based on a size of the registers and/or a ratio of sizes between the data elements and the size of the registers). Examples disclosed herein copy, move or otherwise supply certain data elements in the array to a register and the computation(s) of the loop are performed on the supplied data of the register. According to examples disclosed herein, the data elements that were copied from the array to the register are removed from the array by shifting the bits of the array. Examples disclosed herein repeat these processes for the iterations of the loop.

As a result of, for example, the repeated compression and population of the array according to examples disclosed herein, system resources are better utilized. For example, register space and/or memory is not populated with unnecessary data. Further, by populating an array with the data elements and shifting the array bits after the number of elements in the array reaches a threshold, the size of the array can be pre-set (e.g., configured ahead of time), thereby avoiding a need for dynamic allocation of memory. Moreover, examples disclosed herein significantly decrease an amount of wasteful computation executions associated with iterations in which data is to be discarded (e.g., not stored in memory). The decrease in wasteful computation execution provided by examples disclosed herein is especially significant for loops having sparse computations. Thus, by using a control mask to compress data elements of a vector and by preventing execution of unnecessary computations, efficiency of the corresponding loop vectorization is increased.

Figure 3:
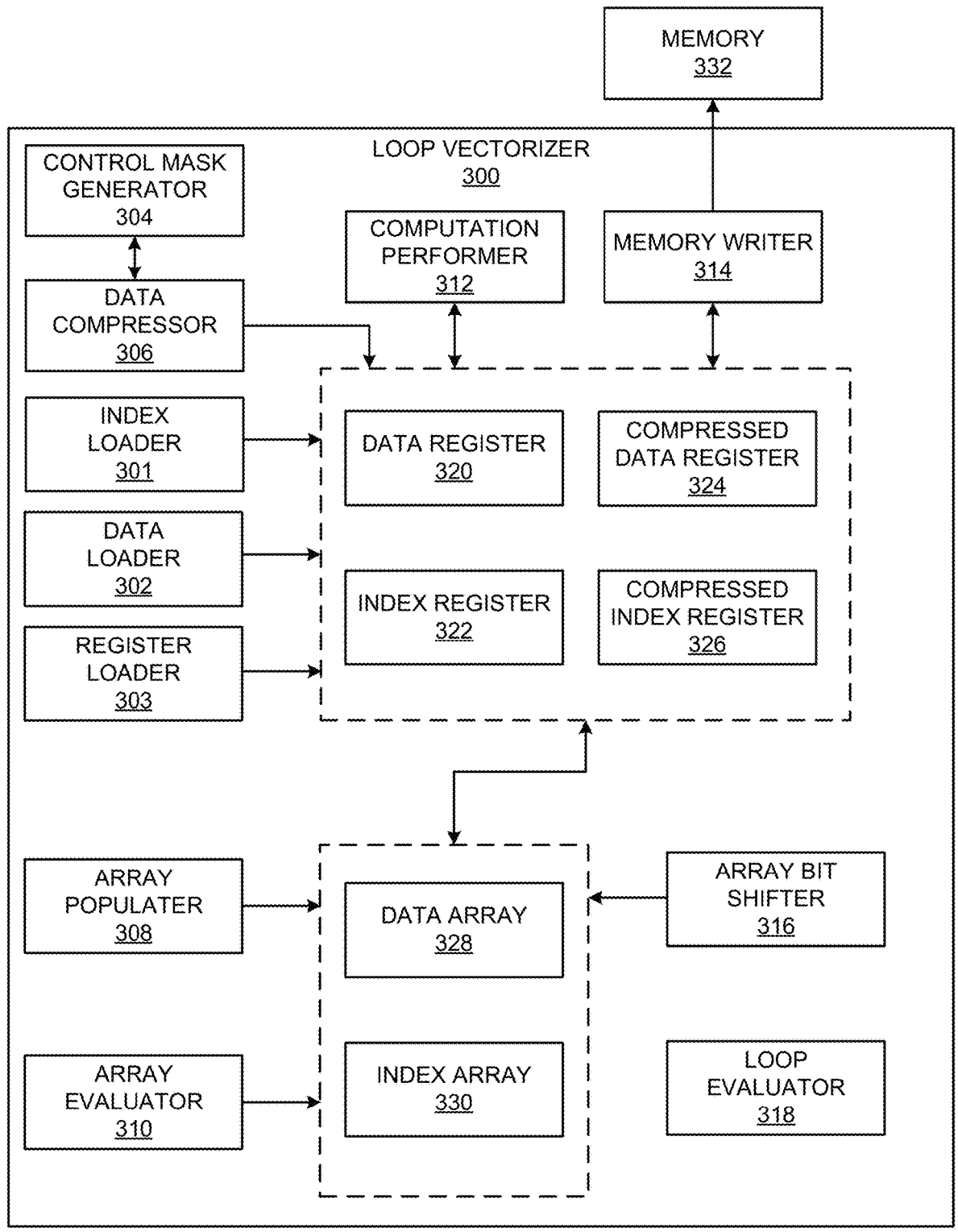
FIG. 3 is a block diagram of an example loop vectorizer constructed in accordance with the teachings of this disclosure.

FIG. 3 is a block diagram of an example loop vectorizer 300 constructed in accordance with the teachings of this disclosure. The example loop vectorizer 300 of FIG. 3 is described below in connection with the example loop 100 of FIG. 1. However, the example loop vectorizer 300 of FIG. 3 can be utilized in connection with additional and/or alternative loops. The example loop vectorizer 300 of FIG. 3 is described below in connection with registers having a vector length (VL) indicative of a number of data elements (e.g., bytes, words, etc.) that can be loaded into one of the registers. The example loop vectorizer 300 assumes that the number of loop iterations to be vectorized is a multiple of VL. The value of VL can be calculated as a ratio between the size of a register and the size of the data type in the loop (e.g., VL=4 when the register size is 128 bits and the loop operates on a 32-bit integer).

Figure 4:
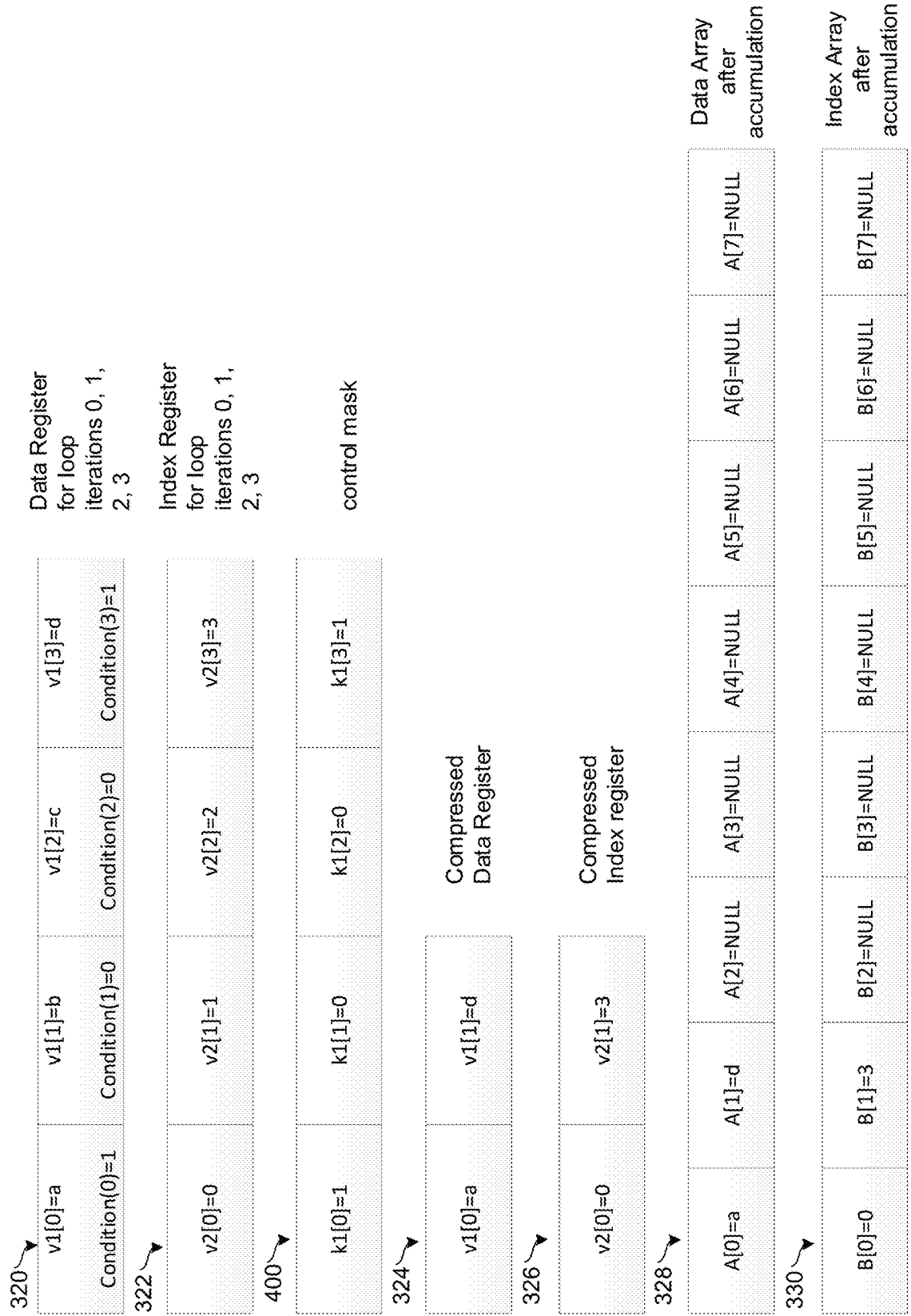
FIGS. 4-6 illustrate example contents of example data registers and example arrays associated with the example loop vectorizer of FIG. 3.
Figure 5:
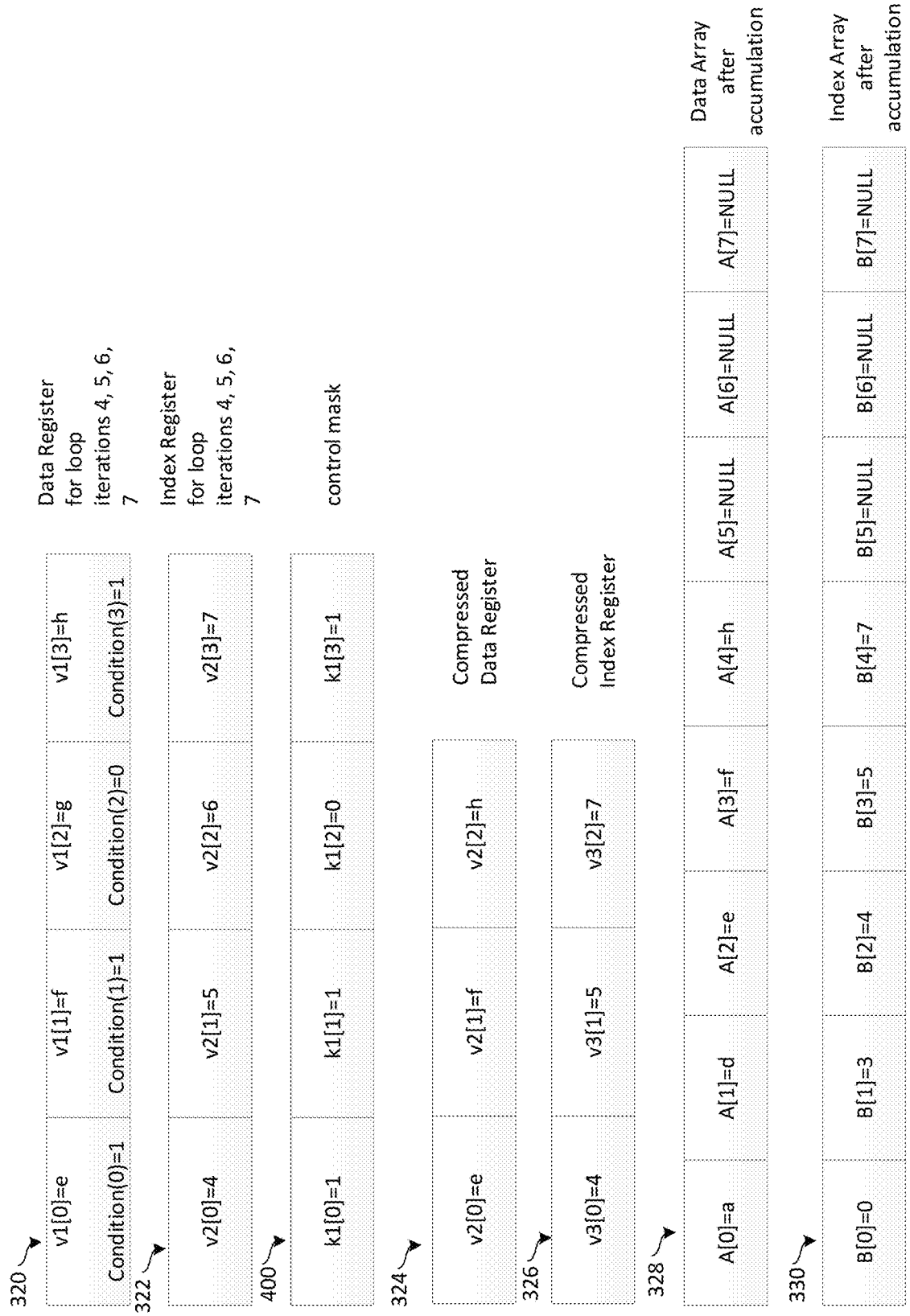
Figure 6:
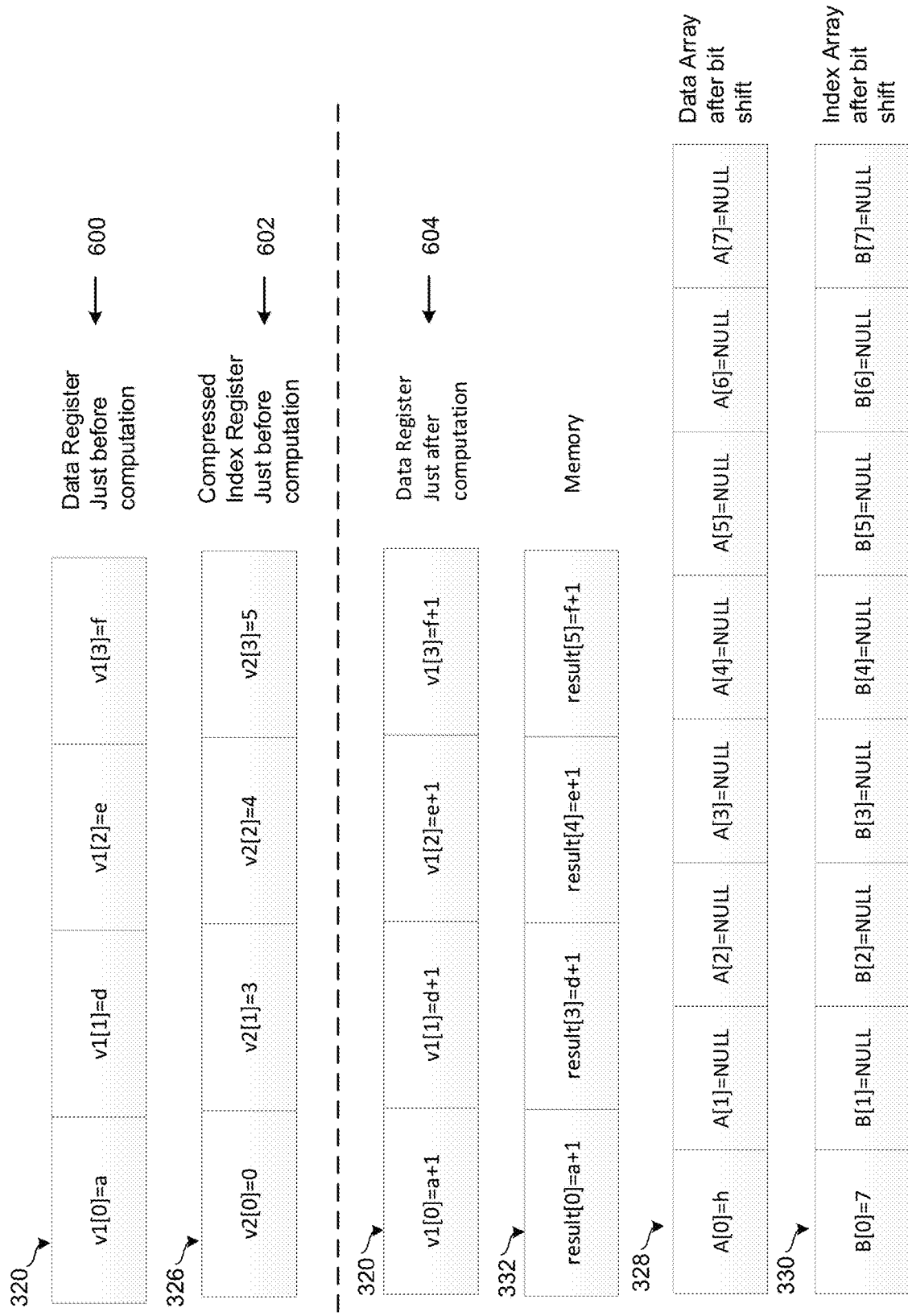

FIGS. 4-6 illustrate example registers used by the example loop vectorizer 300 of FIG. 3 and example contents of the registers at different stages of the vectorization provided by the example loop vectorizer 300 of FIG. 3. In particular, the example of FIG. 4 illustrates contents of example registers and array after a first set of iterations of the loop 100 of FIG. 1 have been processed by the example loop vectorizer 300 of FIG. 3. FIG. 5 illustrates contents of example registers and array after a second set of iterations of the loop 100 have been processed by the example loop vectorizer 300 of FIG. 3. FIG. 6 illustrates contents of example registers and array after a third set of iterations of the loop 100 have been processed by the example loop vectorizer 300 of FIG. 3. FIGS. 4-6 are discussed further below in connection with FIG. 3.

The example loop vectorizer 300 of FIG. 3 includes an index loader 301, a data loader 302 and a register loader 303 to load elements into registers when appropriate (according to instructions generated by the loop vectorizer 300 as described in detail below). The example data loader 302 of FIG. 3 loads data for VL iterations of the loop into a data register 320. In the illustrated example, the data register 320 to be used by the example loop vectorizer 300 is populated by four (4) data elements, each of which correspond to an iteration of the loop 100 of FIG. 1. That is, the size (VL) of the data register 320 is four (4) and, thus, the example data loader 302 of FIG. 3 loads data corresponding to four (4) iterations of the loop 100 at a time for processing. For example, FIG. 4 illustrates the contents of the data register 320 of FIG. 3 after the example data loader 302 loads data (represented by data elements a, b, c and d in FIG. 4) corresponding to iterations zero (0), one (1), two (2) and three (3) of the loop 100.

Further, the example index loader 301 of FIG. 3 loads indexes corresponding to the VL iterations of the loop 100 of FIG. 1 into an index register 322. In the illustrated example, the indexes of the index register 322 enable the data elements of the data register 320 to be properly stored in the correct memory location after the computations are performed. In other words, the indexes in the index register 322 indicate which iteration(s) of the loop 100 the data elements in the data register 320 represent. Accordingly, the indexes of the index register 322 also indicate the respective locations in memory at which data elements of the data register 320 are to be stored according to the storage operation 110 of the loop 100 of FIG. 1. For example, FIG. 4 illustrates the contents of the index register 322 after indexes zero (0), one (1), two (2) and three (3) are loaded by the index loader 301 for the first four (4) iterations of the loop 100.

The example loop vectorizer 300 of FIG. 3 includes a control mask generator 304 to generate a control mask to be used in the vectorization of the loop 100 of FIG. 1. Each bit of the control mask generated by the example control mask generator 304 of FIG. 3 is set to a logical one (1) or a logical zero (0). To set the individual bits of the control mask, the example control mask generator 304 of FIG. 3 evaluates the condition 104 of the loop 100 in the different iterations of the loop 100. For an iteration in which the condition evaluates to a value that causes a corresponding computation to be executed according to the code of the loop, the example control mask generator 304 of FIG. 3 sets the corresponding bit of the control mask to a logical one (1). For an iteration in which the condition evaluates to a value that cause a corresponding computation not to be executed according to the code of the loop, the example control mask generator 304 of FIG. 3 sets the corresponding bit of the control mask to a logical zero (0).

In the illustrated example, the control mask generator 304 generates a control mask having a number of bits corresponding to a size of the data register 320. In the example, the data register 320 to be used by the example loop vectorizer 300 of FIG. 3 can be populated by four (4) data elements, each of which correspond to a respective iteration of the loop 100 of FIG. 1. That is, the size (VL) of the data register 320 is four (4). Accordingly, a first example instance of the example control mask 400 of FIG. 4 generated by the example control mask generator 304 for the data register 320 has four (4) bits. As shown in FIG. 4, the condition 104 for iteration zero (0) of the loop 100 evaluates to true and, thus, a first bit of the control mask 400 is set to a logical one (1). The condition 104 for iteration one (1) of the loop 100 evaluates to false and, thus, a second bit of the control mask 400 is set to a logical zero (0). Similar calculations are performed for the remaining iterations of the loop 100 to complete the control mask 400.

The example loop vectorizer 300 of FIG. 3 includes a data compressor 306 to compress the data in the data register 320 and the indexes in the index register 322 using the control mask 400 generated by the control mask generator 304. In the illustrated example, no computations should be performed on loop iterations in which the condition evaluates to false. Accordingly, the example data compressor 306 of FIG. 3 compresses the data in the data register 320 and stores the results of the compression in a compressed data register 324. Further, the example data compressor 306 compresses the data in the index register 322 and stores the results of the compression in a compressed index register 326. To compress the data, the example data compressor 306 copies the data elements that have a corresponding value of one (1) in the control mask 400 from the data register 320 to the compressed data register 324 and does not copy (e.g., omits) data elements that have a corresponding value of zero (0) in the control mask 400 from the compressed data register 324. Analogously, to compress the indexes, the example data compressor 306 copies the indexes that have a corresponding value of one (1) in the control mask 400 from the index register 322 to the compressed index register 326 and does not copy (e.g., omits) data elements that have a corresponding value of zero (0) in the control mask 400.

The example of FIG. 4 shows the contents of the compressed data register 324 and the contents of the compressed index register 326 after compression by the data compressor 306 using example control mask 400. In the example of FIG. 4, because the bits of the control mask 400 associated with iterations zero (0) and three (3) of the loop 100 is set to a logical one (1), the example data compressor 306 copies the corresponding data elements to the compressed data register 324. The data compressor 306 does not copy the data elements corresponding to iterations one (1) and two (2) of the loop 100 because the corresponding bits of the control mask 400 are set to a logical zero (0). Thus, data elements a and d are placed in the compressed data register 324 and data elements b and c are omitted from the compressed data register 324. In some examples, the loop vectorizer 300 does not include the compressed data register 324 and the compressed data is stored in the data register 320 (e.g., in the lower two data element positions of the data register 320). In some examples, the loop vectorizer 300 does not include the compressed index register 322 and the compressed index information is stored in the index register 322 (e.g., the lower two data element positions of the index register 322).

The example loop vectorizer 300 of FIG. 3 includes an array populater 308 to enter data into a data array 328 and indexes into an index array 330. After the data compressor 306 stores the compressed data in the compressed data register 324 and the compressed indexes in the compressed index register 326, the example array populater 308 of FIG. 3 loads the data from the compressed data register 324 into the data array 328 and from the compressed index register 326 into the index array 330. To continue the above example, FIG. 4 illustrates that data elements a and d have been received by the data array 328 and the corresponding indexes (zero (0) and three (3)) have been received in the index array 330.

In the illustrated example, the size of the data array 328 and the size of the index array 330 is set to 2*VL to avoid overflow. In some examples, the sizes of the data array 328 and the index array 330 is larger when, for example, loop unrolling, data pipelining and/or additional or alternative features are incorporated. In the example shown in FIG. 4, VL is four (4) and, thus, the size of the arrays 328 and 330 is eight (8).

The example loop vectorizer 300 of FIG. 3 includes an array evaluator 310 to analyze the arrays 328, 330 to determine if a threshold number of data elements have been populated in the arrays 328, 330. In the illustrated example, the array evaluator 310 determines whether at least VL data elements have been populated in the arrays 328, 330 to determine whether to continue processing the iterations of the loop 100 and populating the arrays 328, 300 or to perform the computations or operations 108-110 of the loop 100 using the iterations that have been entered into the arrays 328, 330. If less than VL data elements have been entered into the arrays 328, 330, then the example array evaluator 310 instructs the example loop vectorizer 300 to process the next VL iterations of the loop 100 (e.g., by loading the next set of iterations of the loop 100 into the data register 320 as described below in connection with FIG. 5). Otherwise, if VL or more elements have been entered into the arrays 328, 330, then the example array evaluator 310 instructs the example loop vectorizer 300 to perform the operations 108-110 of the loop 100 on the iterations that have been entered into the arrays 328, 330 (as described below in connection with FIG. 6). In the illustrated example of FIG. 4, in which VL is four (4) and iterations zero (0) through three (3) have been processed, the arrays 328, 330 include two (2) elements, which is less than four (4). Therefore, at the stage illustrated in FIG. 4, the example array evaluator 310 of FIG. 3 determines that less than VL elements have been entered into the arrays 328, 330. Accordingly, the example array evaluator 310 generates an indication that further iterations (e.g., the next four (4) iterations) of the loop 100 are to be processed by the example loop vectorizer 300 of FIG. 3.

FIG. 5 illustrates contents of data register 320, the index register 322, the control mask 400, the compressed data register 324, the compressed index register 326, and the arrays 328, 330 associated with the example loop vectorizer 300 in connection with processing of a second set of iterations of the loop 100. In the illustrated example in which VL is four (4), the data loader 302 loads data (represented by data elements e, f, g and h in FIG. 5) corresponding to the next four (4) iterations of the loop 100, which are iterations four (4), five (5), six (6) and seven (7) of the loop 100 of FIG. 1. In the example of FIG. 5, the condition 104 of the loop 100 evaluates to true for iterations four (4), five (5), and seven (7). Further, in the example of FIG. 5, the condition 104 evaluates to false for iteration six (6) of the loop 100. In the example of FIG. 5, the index loader 301 loads indexes corresponding to the data in the data register 320 into the index register 322.

According to the condition evaluation information associated with the data register 320, the example control mask generator 304 generates the control mask 400 to have the values shown in FIG. 5. As described above, the example data compressor 306 of FIG. 3 compresses the data of the data register 320 and the indexes of the index register 326 using the control mask 400. In the example of FIG. 5, because the bit of the control mask 400 associated with iteration six (6) of the loop 100 is set to a logical zero (0), the example data compressor 306 omits the corresponding data element from the compressed data register 324. Further, the example data compressor 306 copies the data elements corresponding to the bits of the control mask 400 set to a logical one (1) to the compressed data register 324. Thus, in the example of FIG. 5, data elements e, f and h are placed in the compressed data register 324 and data element g is omitted from the compressed data register 324. The example data compressor 306 performs similar operations on the index register 322 and the compressed index register 326.

The example array populater 308 of FIG. 3 enters the data from the compressed data register 324 into the next available (e.g., NULL) position(s) of the data array 328. Further, the example array populater 308 enters the indexes from the compressed index register 326 into the next available (e.g., NULL) position(s) of the index array 330. As shown in the example of FIG. 5, the two lower order positions of example arrays 328, 330 retain the values entered into the arrays 328, 330 in connection with the first set of iterations of the loop (iterations zero (0) through three (3) corresponding to FIG. 4), while the higher order positions of arrays 328, 330 have received the data elements from example the compressed registers 324, 326 in connection with the second set of iterations of the loop 100 (iterations four (4) through seven (7) corresponding to FIG. 5). In the example of FIG. 5, the array evaluator 310 evaluates the arrays 328, 330 and determines that at least VL (e.g., four (4)) data elements have been entered into the arrays 328, 330. In particular, the arrays 328, 330 include five (5) data elements corresponding to iterations zero (0), three (3), four (4), five (5) and seven (7) of the loop 100.

Because VL or more data elements have populated the arrays 328, 330, the example array evaluator 310 instructs the loop vectorizer 300 to perform the operations 108-110 of the loop 100 on the first VL elements of the arrays 328, 330. In the illustrated example, to perform the operations 108-110 of the loop 100, the register loader 303 loads the first VL elements of the data array 328 into the data register 320. That is, in the illustrated example, the data register 320 is repurposed from facilitating review of the condition 104 of the loop 100 to hosting data for loop computation purposes such that the operations 108-110 of the loop 100 can be executed. In some examples, the register loader 303 loads the first VL elements of the data array 328 into the compressed data register 324 for loop computation purposes (i.e., rather than the data register 320).

FIG. 6 shows, at reference numeral 600, the contents of the data register 320 after the register loader 303 has loaded the first VL data elements of the data array 328 but before the operations 108-110 of the loop 100 are executed. As shown in FIG. 6, the data register 320 includes data elements a, d, e, and f, which correspond to the first VL data elements stored in the data array 328 in FIG. 5. Further, the example register loader 303 loads the first VL indexes of the index array 330 into the compressed index register 326. In the illustrated example, the first VL indexes of the index array 330 are loaded into the compressed index register 326 such that the contents of the index register 322 are preserved (e.g., at least until the operations 108-110 of the loop 100 are executed). As shown in FIG. 6 at reference numeral 602, the compressed index register 326 includes indexes zero (0), three (3), four (4) and five (5), which correspond to the first VL indexes in the index array 330 in FIG. 5.

The example loop vectorizer 300 of FIG. 3 includes a computation performer 312 to perform the operations of the loop 100 on the data currently loaded in the data register 320. The specific computations to be performed by the example computation performer 312 is specified in the code of the loop 100 (e.g., at operations 108 in FIG. 1). In the example shown in FIG. 1, the contents of the operations 108 are performed by the example computation performer 312. The results of the operations 108 are stored in the data register 320. For example, assuming that the operations 108 of the loop 100 amount to a value of one (1) being added to a respective data element (e.g., computation(data_tmp) =data_tmp+1), FIG. 6 illustrates the contents of the data register 320 after the computation performer 312 performs the operations 108 of the loop 100 at reference numeral 604.

A memory writer 314 of the example loop vectorizer 300 of FIG. 3 stores the data elements from the data register 320 after the operations 108 have been executed into memory 332 as specified by the code of the loop 100 (i.e., write operation 110). In particular, the example memory writer 314 uses the values of the compressed index register 326 to place the data elements in the proper locations in the memory 332. FIG. 6 illustrates the contents of certain memory locations after the example memory writer 314 writes the data from the data register 320 into the memory 332 using the indexes from the compressed index register 326.

The example loop vectorizer 300 of FIG. 3 includes an array bit shifter 316 to shift the highest order VL elements of the data array 328 and the index array 330 to the lower order VL positions of the respective arrays 328, 330. In the illustrated example, the bit shifting is performed after the example register loader 303 loads the lower order VL elements from the arrays 328, 330 to the registers 320, 326 to clear those VL elements from the arrays 328, 330. FIG. 6 illustrate the contents of the data array 328 and the index array 330, respectively, after the example array bit shifter 316 of FIG. 3 shifts the bits of the arrays 328, 330.

The example loop vectorizer 300 of FIG. 3 includes a loop evaluator 318 to determine whether each iteration of the loop 100 has been processed (e.g., by evaluating the loop definition 102 of FIG. 1). If not, the example loop evaluator 318 instructs the loop vectorizer 300 to proceed to the next VL iterations of the loop 100. If each iteration of the loop has been processed, the loop vectorizer 300 processes any data elements that remain in the arrays 328, 330. Remainder elements arise from the fact that data elements are only sent from the arrays 328, 330 to the registers 320, 326 and the computation performed after the array evaluator 310 determines that at least VL elements have populated in each of the arrays 328, 330. However, it is possible that the loop evaluator 318 may determine that the end of the loop 100 has been reached when there is still some number of elements less than VL remaining in the arrays 328, 330. The operations 108-110 of these iterations still need to be executed by, for example, the computation performer 312 of FIG. 3. Accordingly, after the loop evaluator 318 determines that the end of the loop 100 has been reached, the control mask generator 304 generates a remainder mask of VL elements wherein the lower order bits, corresponding to the elements remaining in the arrays 328, 330, are set to a logical one (1) and the remaining higher order bits, corresponding to non-existent elements in the arrays 328, 330, are set to a logical zero (0). The example register loader 303 of FIG. 3 loads the remaining data elements from the data array 328 to the data register 320 and loads the remaining indexes from the index array 330 to the compressed index register 326. The example computation performer 312 of FIG. 3 performs the operations 108 on the data of the data register 320. The example memory writer 314 of FIG. 3 stores the results of the operations 108 from the data register 320 into the appropriate locations in the memory 332 using the respective values of the compressed index register 326. The memory writer 314 also uses the remainder mask to ensure that no elements from the data register 320 with a corresponding zero (0) in the remainder mask are stored in the memory 332.

While an example manner of implementing the loop vectorizer 300 has been illustrated in FIG. 3, one or more of the elements, processes and/or devices illustrated in FIG. 3 may be combined, divided, re-arranged, omitted, eliminated and/or implemented in any other way. Further, the example index loader 301, the example data loader 302, the example register loader 303, the example control mask generator 304, the example data compressor 306, the example array populater 308, the example array evaluator 310, the example computation performer 312, the example memory writer 314, the example array bit shifter 316, the example loop evaluator 318, and/or, more generally, the example loop vectorizer 300 of FIG. 3 may be implemented by hardware, software, firmware and/or any combination of hardware, software and/or firmware. Thus, for example, any of the example index loader 301, the example data loader 302, the example register loader 303, the example control mask generator 304, the example data compressor 306, the example array populater 308, the example array evaluator 310, the example computation performer 312, the example memory writer 314, the example array bit shifter 316, the example loop evaluator 318 and/or, more generally, the example loop vectorizer 300 of FIG. 3 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example index loader 301, the example data loader 302, the example register loader 303, the example control mask generator 304, the example data compressor 306, the example array populater 308, the example array evaluator 310, the example computation performer 312, the example memory writer 314, the example array bit shifter 316, the example loop evaluator 318 and/or, more generally, the example loop vectorizer 300 of FIG. 3 is hereby expressly defined to include a tangible computer readable storage medium such as a memory, DVD, CD, Blu-ray, etc. storing the software and/or firmware. Further still, the example loop vectorizer 300 of FIG. 3 may include one or more elements, processes and/or devices in addition to, or instead of, those illustrated in FIG. 3, and/or may include more than one of any or all of the illustrated elements, processes and devices.

Figure 7:
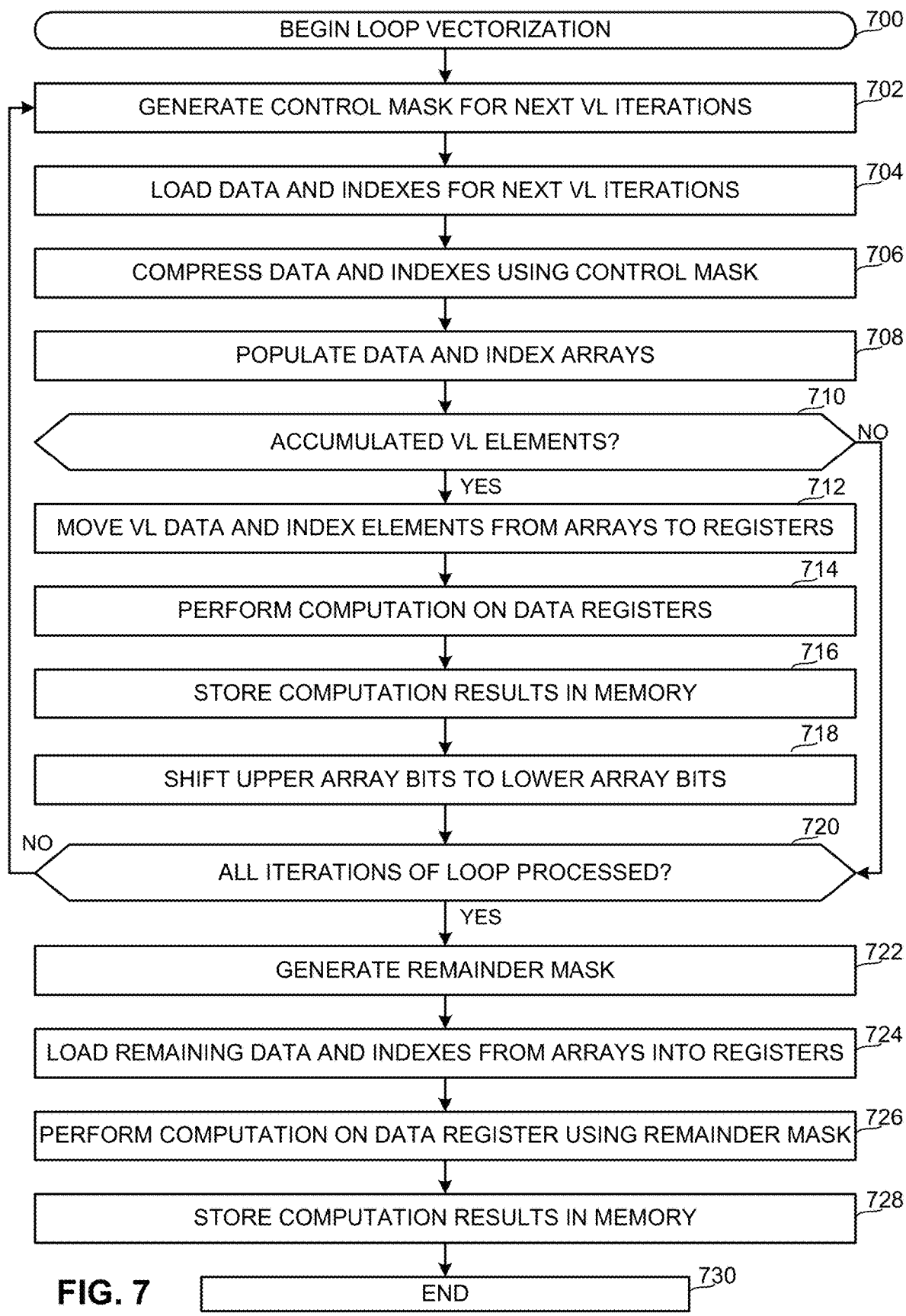
FIG. 7 is a flowchart representative of example machine readable instructions that may be executed to implement the example loop vectorizer of FIG. 3.

FIG. 7 is a flowchart representative of example machine readable instructions for implementing the example loop vectorizer 300 of FIG. 3. In the example flowchart of FIG.

7, the machine readable instructions comprise program(s) for execution by a processor such as the processor 1212 shown in the example computer 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program(s) is described with reference to the flowcharts illustrated in FIG. 7, many other methods of implementing the example loop vectorizer 300 of FIG. 3 may alternatively be used. For example, the order of execution of the blocks may be changed, and/or some of the blocks described may be changed, eliminated, or combined.

As mentioned above, the example processes of FIG. 7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 begins with a call to the example loop vectorizer 300 of FIG. 3 to begin a vectorization of the example loop 100 of FIG. 1 (block 700). As described above, the example loop 100 includes a plurality of iterations each having a condition 104 that dictates whether the operations 106-110 should be executed for a respective iteration of the loop 100. The example control mask generator 304 of FIG. 3 generates a control mask for the first VL iterations of the loop 100, where VL corresponds to a number of data elements that can be entered into the data register 320 of FIG. 3 (block 702). The control mask indicates the iterations for which the condition 104 evaluates to true (e.g., by setting a corresponding bit to a logical one (1)). The example data loader 302 of FIG. 3 loads the first VL data elements corresponding to the first VL iterations of the loop 100 into the data register 320. The example index loader 301 loads the first VL indexes corresponding to the first VL iterations of the loop 100 into the index register 322 (block 704). As described above, the example data compressor 306 of FIG. 3 uses the control mask 400 to compress the data elements of the data register 320 into the compressed data register 324 and the indexes in the index register 322 into the compressed index register 326 (block 706).

After the data and indexes have been compressed, the example array populater 308 of FIG. 3 enters the data elements from the compressed data register 324 into the data array 328 and the indexes from the compressed index register 326 into the index array 330 (block 708). The example array evaluator 310 of FIG. 3 evaluates the arrays 328, 330 to determine whether at least VL elements have been entered into the arrays 328, 330 (block 710). If not, then control passes to block 720, which is described below. Otherwise, if the example array evaluator 310 of FIG. 3 determines that at least VL elements have been entered into the arrays 328, 330 (block 710), the register loader 303 loads the first VL elements from the data array 328 into the data register 320 and the first VL indexes from the index array 330 into the compressed index register 326 (block 712). The example computation performer 312 performs the operations 108 specified in the loop 100 as shown in FIG. 1 on the data register 320 (block 714). When the operations 108 have been performed, the example memory writer 314 of FIG. 3 writes the resulting data elements of the data register 320 into the appropriate locations in the memory 332 (block 716). In the illustrated example, the appropriate locations in the memory 332 are determined using the indexes from the compressed index register 326. After the results of the computation are written to the memory 332, the example array bit shifter 316 of FIG. 3 shifts the higher order VL bits of the arrays 328, 330 to the lower order bits of the arrays 328, 330 (block 718).

Control then arrives at block 720. Control may alternatively arrive at block 720 from block 710 when the array evaluator 310 determines that at least VL elements have not been entered into the arrays 328, 330. The example loop evaluator 318 of FIG. 3 determines whether all iterations of the loop 100 have been processed (block 720). If not, control passes to block 702. Otherwise, to process remainder iterations of the loop 100, the control mask generator 304 generates a remainder mask (block 722). The register loader 303 loads the remaining data elements from the data array 328 to the data register 320 and loads the remaining indexes from the index array 330 to the compressed index register 326 (block 724). The computation performer 312 performs the operations 108 of the loop 100 on the data elements of the data register 320 (block 726). The memory writer 314 writes the resulting data from the data register 320 into the memory 332 using the remainder mask and the indexes in the compressed index register 326 to ensure that the appropriate data is stored in the appropriate memory locations (block 728). The example of FIG. 7 then ends (block 730).

FIG. 8 illustrates example pseudo-code 800 representative of a vectorization of the example loop 100 of FIG. 1 implemented by the example loop vectorizer 300 of FIG. 3, corresponding to the flowchart of FIG. 7. In the vectorization code 800 of FIG. 8, the loop vectorization begins with line 802, which corresponds to block 700 of FIG. 7. In the example of FIG. 8, lines 804-810 correspond to initialization of certain variables. In particular, in line 804, the variable T tracks the current iteration of the loop 100. The variable 'n,' in line 810, tracks how many data elements have been entered (e.g., are accumulated) in the arrays 328, 330. In line 806 of the example pseudo-code 800, the first VL indexes are loaded into a vector 'v_index' which is represented by the index register 322 of FIG. 3. In line 808 of the example pseudo-code 800, a vector 'v_VL' is created with each data element of the vector having the value VL, such that this vector 'v_VL' can be used to increment vector 'v_index' after each VL iterations of the loop 100 (i.e., one iteration of vectorized loop). As described above, the variable 'VL' represents a number of data elements that the registers 320-326 can host at a given time. In line 812 of the example pseudo-code 800, the loop definition (e.g., the definition 102 of FIG. 1) is set.

In line 814 of the example pseudo-code 800, which corresponds to block 702 of FIG. 7, the control mask generator 304 generates a control mask 'k1' for VL elements. In line 816 of the example pseudo-code 800, which corresponds to block 704 of FIG. 7, VL data elements are loaded into vector 'v1' by the data loader 302. In the example of FIG. 8, indexes do not need to be loaded at this stage, as in block 704 of FIG. 7, because the indexes were loaded in line 806.

In line 818 of the example pseudo-code 800, the data compressor 306 compresses data elements in vector 'v1' using the control mask 'k1' and the results of the compression are stored in vector 'v2.' In line 820 of the example pseudo-code 800, the data compressor 306 compresses indexes in vector 'v_index' using the control mask 'k1' and the results of the compression are stored in vector 'v3.' The compression of the data elements and the indexes in lines 818 and 820 of FIG. 8 correspond to block 706 of FIG. 7.

In line 822 of the example pseudo-code 800, the array populater 308 enters the data elements of vector 'v2' into array 'A.' In line 824 of FIG. 8, the array populater 308 enters the data elements of vector 'v3' into array 'B.' Lines 822 and 824 of FIG. 8 correspond to block 708 of FIG. 7.

In line 826 of the example pseudo-code 800, the variable 'n' is increased by the number of elements that were accumulated in the arrays in lines 822 and 824. In line 828 of the example pseudo-code 800, the variable 'i' is increased by VL as an additional VL iterations have been processed. In line 830 of the example pseudo-code 800, index loader 301 generates values of indexes corresponding to the next VL iterations. In other words, the vector 'v_index' is increased by the vector 'v_VL'. This increases the value of the elements of vector 'v_index' and effectively loads the next VL indexes into vector 'v_index.'

In line 832 of the example pseudo-code 800, which corresponds to block 710 of FIG. 7, the example array evaluator 310 determines whether at least VL elements have accumulated in the arrays 328, 330. If VL elements have accumulated in the arrays 328, 330, then VL data elements are moved from array 'A' to vector 'v1' in line 834 of FIG. 8. Further, in line 836 of the example pseudo-code 800, VL indexes are moved from array 'B' to vector 'v2.' Lines 834 and 836 of FIG. 8 correspond to block 712 of FIG. 7.

In line 838 of the example pseudo-code 800, which corresponds to block 714 of FIG. 7, the operations 108 of the loop 100 are performed on vector 'v1.' In line 840 of FIG. 8, which corresponds to block 716 of FIG. 7, the memory writer 314 writes the results of the computation to the memory 332. In lines 842 and 844 of the example pseudo-code 800, which corresponds to block 718 of FIG. 7, the array bit shifter 316 shifts the bits of arrays 'A' and 'B.' In line 846 of the example pseudo-code 800, the variable 'n' is decreased by VL to indicate that there are now VL less elements in the arrays 328, 330.

In line 848 of the example pseudo-code 800, which corresponds to block 720 of FIG. 7, the example loop evaluator 318 determines whether the input stream is at an end (e.g., whether all iterations of the loop 100 have been processed (e.g., vectorized or discarded). Once the input stream is at an end, in line 850 of the example pseudo-code 800, which corresponds to block 722 of FIG. 7, a remainder mask 'k2' is generated by the mask generator 304. In line 852 of the example pseudo-code 800, the remainder data elements are loaded into vector 'v1' and in line 854, the remainder indexes are loaded into vector 'v3.' Lines 852 and 854 correspond to block 724 of FIG. 7. In line 856 of the example pseudo-code 800, which corresponds to block 726 of FIG. 7, the computation performer 312 performs the operations 108 on the remainder data. In lines 858 of FIG. 8, which corresponds to block 728 of FIG. 7, the memory writer 314 writes results of the remainder operations 108 to the memory 332 using the remainder mask 'k2.' The example pseudo-code 800 of FIG. 8 then ends.

Figure 9:
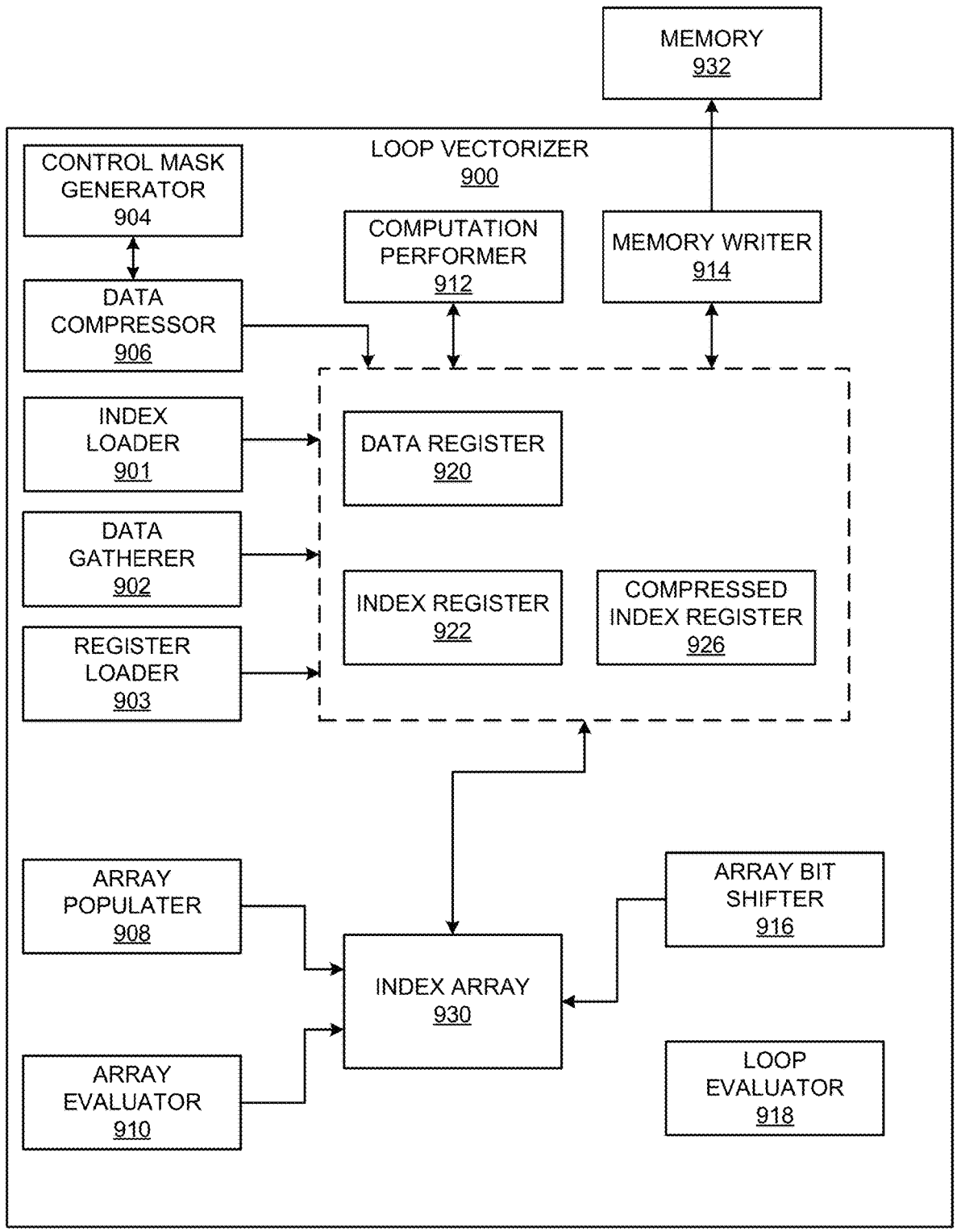
FIG. 9 is a block diagram of an example loop vectorizer constructed in accordance with the teachings of this disclosure

FIG. 9 is a block diagram of another example loop vectorizer 900 constructed in accordance with the teachings of this disclosure. The example loop vectorizer 900 of FIG. 9 is described below in connection with the example loop 100 of FIG. 1. However, the example loop vectorizer 900 of FIG. 9 can be utilized in connection with additional and/or alternative loops. The example loop vectorizer 900 of FIG. 9 is described below in connection with registers having a vector length (VL) indicative of a number of data elements (e.g., bytes, words, etc.) that can be loaded into one of the registers. The example loop vectorizer 900 assumes that the number of loop iterations to be vectorized is a multiple of VL. The value of VL can be calculated as a ratio between the size of a register and the size of the data type in the loop (e.g., VL=4 when the register size is 128 bits and the loop operates on a 32-bit integer)

The example loop vectorizer 900 of FIG. 9 includes an index loader 901 to load indexes into an index register 922. The index loader 901 and the index register 922 of FIG. 9 operate in a similar manner as the index loader 301 and the index register 322 of FIG. 3. The example loop vectorizer 900 of FIG. 9 includes a control mask generator 904 that operates in a similar manner as the control mask generator 304 of FIG. 3. The example loop vectorizer 900 of FIG. 9 includes a data compressor 906 that compresses indexes in the index register 922 into a compressed index register 926 using the control mask generated by the control mask generator 904. The data compressor 906 of FIG. 9 compresses indexes in a similar manner as the data compressor 306 of FIG. 3. The compressed index register 926 of FIG. 9 operates in a similar manner as the compressed indexed register 326 of FIG. 3. The example loop vectorizer 900 of FIG. 9 includes an array populater 908 to load indexes into an index array 930. The array populater 908 and the index array 930 of FIG. 9 operate in a similar manner as the array populater 308 and the index array 330 of FIG. 3. However, the example loop vectorizer 900 of FIG. 9 does not include a data array (e.g., the example data array 328 of FIG. 3). Instead, as described below, the example loop vectorizer 900 of FIG. 9 utilizes the indexes of the index array 930 to determine or identify the corresponding data values. The example loop vectorizer 900 of FIG. 9 includes an array evaluator 910 to evaluate whether VL or more elements have accumulated in the index array 930 in a similar manner as the array evaluator 310 of FIG. 3. The example loop vectorizer 900 of FIG. 9 includes a register loader 903 to load indexes from the index array 930 to the compressed index register 926 in a similar manner as the register loader 303 of FIG. 3. The example loop vectorizer 900 of FIG. 9 includes a data gatherer 902 that loads data values into a data register 920.

In the illustrated example of FIG. 9, after indexes have been loaded from the index array 930 to the compressed index register 926 by the register loader 903, the example data gatherer 902 of FIG. 9 identifies data values corresponding to the indexes of the compressed index register 926 and loads the identified data values into the data register 920. Thus, in the example of FIG. 9, the indexes of the compressed index register 926 are utilized to identify the corresponding data values and, in doing so, avoids having to utilize a compressed data register (e.g., the compressed data register 324 of FIG. 3). Moreover, using the indexes to identify the appropriate data values enables the example loop vectorizer 900 of FIG. 9 to utilize the index array 930 without having to populate or maintain a corresponding data array (e.g., the data array 328 of FIG. 3).

The example loop vectorizer 900 of FIG. 9 includes a computation performer 912 that operates in a similar manager as the computation performer 312 of FIG. 3. The example loop vectorizer 900 of FIG. 9 includes an array bit shifter 916 that shifts the bits of the index array 930 in a similar manner as the array bit shifter 316 of FIG. 3. The example loop vectorizer 900 of FIG. 9 includes a loop evaluator 918 that operates in a similar manner as the loop evaluator 318 of FIG. 3. The example loop vectorizer 900 of FIG. 9 includes a memory writer 914 that operates in similar manner as the memory writer 314 of FIG. 3. The example loop vectorizer 900 of FIG. 9 includes a memory 932 that operates in a similar manner as the memory 332 of FIG. 3.

While an example manner of implementing the loop vectorizer 900 has been illustrated in FIG. 9, one or more of the elements, processes and/or devices illustrated in FIG. 9 may be combined, divided, re-arranged, omitted, eliminated and/or implemented in any other way. Further, the example index loader 901, the example data gatherer 902, the example register loader 903, the example control mask generator 904, the example data compressor 906, the example array populater 908, the example array evaluator 910, the example computation performer 912, the example memory writer 914, the example array bit shifter 916, the example loop evaluator 918, and/or, more generally, the example loop vectorizer 900 of FIG. 9 may be implemented by hardware, software, firmware and/or any combination of hardware, software and/or firmware. Thus, for example, any of the example index loader 901, the example data gatherer 902, the example register loader 903, the example control mask generator 904, the example data compressor 906, the example array populater 908, the example array evaluator 910, the example computation performer 912, the example memory writer 914, the example array bit shifter 916, the example loop evaluator 918 and/or, more generally, the example loop vectorizer 900 of FIG. 9 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example index loader 901, the example data gatherer 902, the example register loader 903, the example control mask generator 904, the example data compressor 906, the example array populater 908, the example array evaluator 910, the example computation performer 912, the example memory writer 914, the example array bit shifter 916, the example loop evaluator 918 and/or, more generally, the example loop vectorizer 900 of FIG. 9 is hereby expressly defined to include a tangible computer readable storage medium such as a memory, DVD, CD, Blu-ray, etc. storing the software and/or firmware. Further still, the example loop vectorizer 900 of FIG. 9 may include one or more elements, processes and/or devices in addition to, or instead of, those illustrated in FIG. 9, and/or may include more than one of any or all of the illustrated elements, processes and devices.

Figure 10:
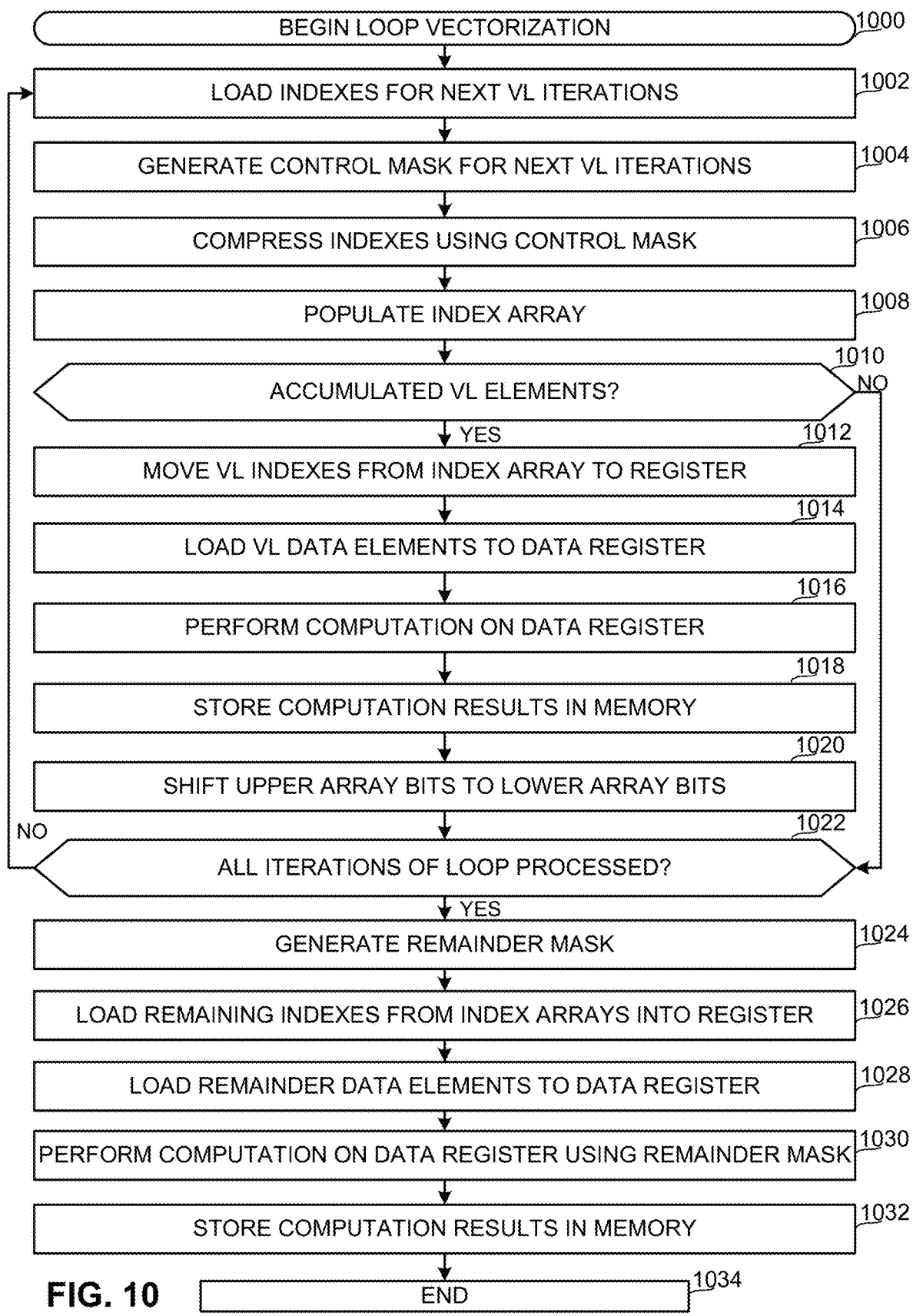
FIG. 10 is a flowchart representative of example machine readable instructions that may be executed to implement the example loop vectorizer of FIG. 9.

FIG. 10 is a flowchart representative of example machine readable instructions for implementing the example loop vectorizer 900 of FIG. 9. In the example flowchart of FIG. 10, the machine readable instructions comprise program(s) for execution by a processor such as the processor 1212 shown in the example computer 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program(s) is described with reference to the flowcharts illustrated in FIG. 10, many other methods of implementing the example loop vectorizer 900 of FIG. 9 may alternatively be used. For example, the order of execution of the blocks may be changed, and/or some of the blocks described may be changed, eliminated, or combined.

As mentioned above, the example processes of FIG. 10 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIG. 10 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 10 begins with a call to the example loop vectorizer 900 of FIG. 9 to begin a vectorization of the example loop 100 of FIG. 1 (block 1000). The example index loader 901 of FIG. 9 loads the first VL indexes corresponding to the first VL iterations of loop of 100 of FIG. 1 into the index register 922, where VL corresponds to a number of data elements that can be entered into the data register 920 of FIG. 9 (block 1002). The example control mask generator 904 of FIG. 9 generates a control mask for the first VL iterations of the loop 100 (block 1004). The example data compressor 906 of FIG. 9 uses the control mask to compress the indexes in the index register 922 into the compressed index register 926 (block 1006).

After the indexes have been compressed, the example array populater 908 of FIG. 9 enters the indexes from the compressed index register 926 into the index array 930 (block 1008). The example array evaluator 910 of FIG. 9 evaluates the index array 930 to determine whether at least VL elements have been entered into the index array 930 (block 1010). If not, then control passes to block 1022, which is described below. Otherwise, if the example array evaluator 910 of FIG. 9 determines that at least VL indexes have been entered into the index array 930 (block 1010), the register loader 903 loads the first VL indexes from the index array 930 into the compressed index register 926 (block 1012). The example data gatherer 902 then identifies the data values corresponding to the index values of the compressed index register 926 and loads those VL data elements into the data register 920 corresponding to the indexes in the compressed index register 926 (block 1014).

The example computation performer 912 performs the operations 108 specified in the loop 100 as shown in FIG. 1 on the data register 920 (block 1016). When the operations 108 have been performed, the example memory writer 914 of FIG. 9 writes the resulting data elements of the data register 920 into the appropriate locations in the memory 932 (block 1018). In the illustrated example, the appropriate locations in the memory 932 are determined using the indexes from the compressed index register 926. After the results of the computation are written to the memory 932, the example array bit shifter 916 of FIG. 9 shifts the higher order VL bits of the index array 930 to the lower order bits of the index array 930 (block 1020).

Control then arrives at block 1022. Control may alternatively arrive at block 1022 from block 1010 when the array evaluator 910 determines that at least VL elements have not been entered into the index array 930. The example loop evaluator 918 of FIG. 9 determines whether all iterations of the loop 100 have been processed (block 1022). If not, control passes to block 1002. Otherwise, to process remainder iterations of the loop 100, the control mask generator 904 generates a remainder mask (block 1024). The register loader 903 loads the remaining indexes from the index array 930 to the compressed index register 926 (block 1026). The data gatherer 902 then loads data elements into the data register 920 corresponding to the indexes in the compressed index register 926 (block 1028). The computation performer 912 performs the operations 108 of the loop 100 on the data elements of the data register 920 (block 1030). The memory writer 914 writes the resulting data from the data register 920 into the memory 932 using the remainder mask and the indexes in the compressed index register 926 to ensure that the appropriate data is stored in the appropriate memory locations (block 1032). The example of FIG. 9 then ends (block 1034).

FIG. 11 illustrates example pseudo-code 1100 representative of a vectorization of the example loop 100 of FIG. 1 implemented by the example loop vectorizer 900 of FIG. 9, corresponding to the flowchart of FIG. 10. In the example pseudo-code 1100 of FIG. 11, the loop vectorization begins with line 1102, which corresponds to block 1000 of FIG. 10. In the example of FIG. 11, lines 1104-1110 correspond to initialization of certain variables. In particular, in line 1104, the variable 'i' tracks the current iteration of the loop 100. The variable 'n,' in line 1110, tracks how many data elements have been entered (e.g., are accumulated) in the index array 930. In line 1106 of the example pseudo-code 1100, the first VL indexes are loaded into a vector 'v_index' which is represented by the index register 922 of FIG. 9. In line 1108 of the example pseudo-code 1100, a vector 'v_VL' is created with each data element of the vector having the value VL, such that this vector 'v_VL' can be used by the index loader 901 to adjust (e.g., increment) vector 'v_index' after each VL iterations of the loop 100 (i.e., one iteration of vectorized loop). As described above, the variable 'VL' represents a number of data elements that the registers 920-926 can host at a given time. In line 1112 of the example pseudo-code 1100, the loop definition (e.g., the definition 102 of FIG. 1) is set. The loading of the first VL indexes in line 1106 corresponds to block 1002 of FIG. 10.

In line 1114 of the example pseudo-code 1100, which corresponds to block 1004 of FIG. 10, the control mask generator 904 generates a control mask 'k1' for VL elements. In line 1116 of the example pseudo-code 1100, the data compressor 906 compresses the indexes in vector 'v_index' using the control mask 'k1' and the results of the compression are stored in vector 'v3.' The compression of the data elements and the indexes in line 1116 of FIG. 11 correspond to block 1006 of FIG. 10. In line 1118 of the example pseudo-code 1100, the array populater 908 enters the elements of vector 'v3' into array 'B,' which corresponds to block 1008 of FIG. 10.

In line 1120 of the example pseudo-code 1100, the variable 'n' is increased by the number of elements that were accumulated in the array in line 1118. In line 1122 of the example pseudo-code 1100, the variable T is increased by VL as an additional VL iterations have been processed. In line 1124 of the example pseudo-code 1100, the index loader 901 generates indexes for the next VL iterations. In other words, the vector 'v_index' is increased by the vector 'v_VL'. This increases the value of the elements of vector 'v_index' and effectively loads the next VL indexes into vector 'v_index.'

In line 1126 of the example pseudo-code 1100, which corresponds to block 1010 of FIG. 10, the example array evaluator 910 determines whether at least VL elements have accumulated in the index array 930. If VL elements have accumulated in the index array 930, then the example register loader 903 loads VL indexes from array 'B' to vector 'v3' in line 1128. Line 1128 of FIG. 11 corresponds to block 1012 of FIG. 10. In line 1130 of the example pseudo-code 1100, which corresponds to block 1014 of FIG. 10, the example data gatherer 902 gathers VL data elements in vector 'v1' using the indexes in vector 'v3.'

In line 1132 of the example pseudo-code 1100, which corresponds to block 1016 of FIG. 10, the operations 108-110 of the loop 100 are performed on vector 'v1.' In line 1134 of FIG. 11, which corresponds to block 1018 of FIG. 10, the memory writer 914 writes the results of the computation to the memory 932. In lines 1136 of the example pseudo-code 1100, which corresponds to block 1020 of FIG. 10, the array bit shifter 916 shifts the bits of array 'B.' In line 1138 of the example pseudo-code 1100, the variable 'n' is decreased by VL to indicate that there are now VL less elements in the index array 930.

In line 1140 of the example pseudo-code 1100, which corresponds to block 1022 of FIG. 10, the example loop evaluator 918 determines whether the input stream is at an end (e.g., whether all iterations of the loop 100 have been processed (e.g., vectorized or discarded)). Once the input stream is at an end, in line 1142 of the example pseudo-code 1100, which corresponds to block 1024 of FIG. 10, a remainder mask 'k2' is generated by the control mask generator 904. In line 1144 of the example pseudo-code 1100, which corresponds to block 1026 of FIG. 10, the remainder indexes are loaded into vector 'v3.' In line 1146 of the example pseudo-code 1100, which corresponds to block 1028 of FIG. 10, the data gatherer 902 gathers the data elements in vector 'v1' corresponding to the indexes in vector 'v3' and stores the results under the write-mask 'k2.' In line 1148 of the example pseudo-code 1100, which corresponds to block 1030 of FIG. 10, the computation performer 912 performs the operations 108 on the remainder data. In lines 1150 of FIG. 11, which corresponds to block 1032 of FIG. 10, the memory writer 914 writes results of the remainder operations 108 to the memory 932 using the remainder mask 'k2.' The example pseudo-code 1100 of FIG. 11 then ends.

Figure 12:
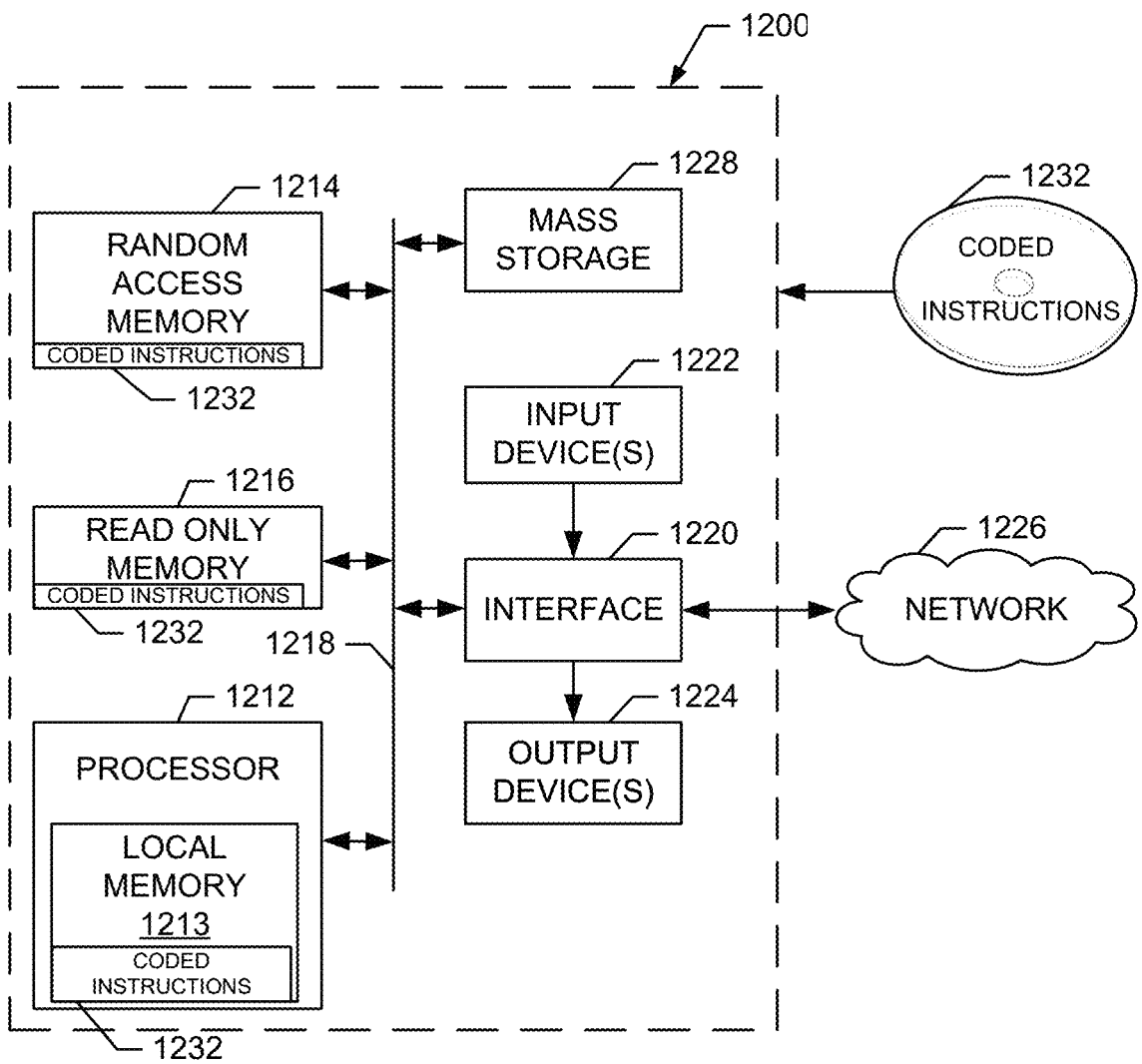
FIG. 12 is a block diagram of an example processing system capable of executing the example machine readable instructions of FIG. 7 to implement the example loop vectorizer of FIG. 3 and/or the example machine readable instructions of FIG. 10 to implement the example loop vectorizer of FIG. 9.

FIG. 12 is a block diagram of a processor platform 1200 capable of executing the instructions of FIG. 7 or FIG. 9 to implement the example loop vectorizer 300 of FIG. 3 or the example loop vectorizer 900 of FIG. 9, respectively. The processor platform 1200 can be, for example, a server, a personal computer, an Internet appliance, a DVD player, a CD player, a Blu-ray player, a gaming console, a personal video recorder, a mobile device (e.g., a smart phone, a tablet, etc.), a printer, or any other type of computing device.

The processor platform 1200 of the instant example includes a processor 1212. As used herein, the term "processor" refers to a logic circuit capable of executing machine readable instructions. For example, the processor 1212 can be implemented by one or more microprocessors or controllers from any desired family or manufacturer.

The processor 1212 includes a local memory 1213 (e.g., a cache) and is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 also includes an interface circuit 1220. The interface circuit 1220 may be implemented by any type of interface standard, such as an Ethernet interface, a universal serial bus (USB), and/or a PCI express interface.

One or more input devices 1222 are connected to the interface circuit 1220. The input device(s) 1222 permit a user to enter data and commands into the processor 1212. The input device(s) can be implemented by, for example, a keyboard, a mouse, a touchscreen, a track-pad, a trackball, isopoint and/or a voice recognition system.

One or more output devices 1224 are also connected to the interface circuit 1220. The output devices 1224 can be implemented, for example, by display devices (e.g., a liquid crystal display, a cathode ray tube display (CRT), a printer and/or speakers). The interface circuit 1220, thus, typically includes a graphics driver card.

The interface circuit 1220 also includes a communication device such as a modem or network interface card to facilitate exchange of data with external computers via a network 1226 (e.g., an Ethernet connection, a digital subscriber line (DSL), a telephone line, coaxial cable, a cellular telephone system, etc.).

The processor platform 1200 also includes one or more mass storage devices 1228 for storing software and data. Examples of such mass storage devices 1228 include floppy disk drives, hard drive disks, compact disk drives and digital versatile disk (DVD) drives.

The coded instructions 1232 of FIG. 12 may be stored in the mass storage device 1228, in the volatile memory 1214, in the non-volatile memory 1216, and/or on a removable storage medium such as a CD or DVD.

Example methods include generating a first control mask for a first set of iterations of a loop by evaluating a condition of the loop, wherein generating the first control mask comprises: setting a bit of the first control mask to a first value when the condition indicates that an operation of the loop is to be executed; and setting the bit of the first control mask to a second value when the condition indicates that the operation of the loop is to be bypassed; and compressing, with a processor, indexes corresponding to the first set of iterations of the loop according to the first control mask by: maintaining a first one of the indexes when a first bit of the first control mask associated with the first index has the first value; and discarding, before the operation is executed, a second one of the indexes when a second bit of the first control mask associated with the second index has the second value.

Some example methods further include compressing data elements corresponding to the indexes, wherein the indexes indicate at which memory locations results of the operation are to be stored for respective ones of the data elements.

Some example methods further include loading the data elements into a first register; and loading the indexes corresponding to the first set of iterations of the loop into a second register.

Some example methods further include populating an array with the compressed indexes, the operation of the loop to be performed on data elements corresponding to the compressed indexes of the array.

Some example methods further include, when the number of indexes that has been entered into the array meets a threshold, loading the data elements corresponding to an amount of the indexes of the array into a register on which the operation is to be performed.

Some example methods further include, when the number of indexes that has been entered in the array does not meet the threshold, evaluating the condition for a second set of iterations of the loop without performing the operation on the data elements corresponding to the indexes of the array.

Some example methods further include shifting indexes at higher order positions of the array to lower order positions of the array when the operation of the loop has been performed on the data elements corresponding to the indexes at the lower order positions of the array.

Example tangible machine readable storage media have instructions that, when executed, cause a machine to at least generate a first control mask for a first set of iterations of a loop by evaluating a condition of the loop, wherein generating the first control mask comprises: setting a bit of the first control mask to a first value when the condition indicates that an operation of the loop is to be executed; and setting the bit of the first control mask to a second value when the condition indicates that the operation of the loop is to be bypassed; and compress indexes corresponding to the first set of iterations of the loop according to the first control mask by: maintaining a first one of the indexes when a first bit of the first control mask associated with the first index has the first value; and discarding, before the operation is executed, a second one of the indexes when a second bit of the first control mask associated with the second index has the second value.

In some example storage media, the instructions cause the machine to load the data elements into a first register; and to load the indexes corresponding to the first set of iterations of the loop into a second register.

In some example storage media, the instructions cause the machine to compress data elements corresponding to the indexes, wherein the indexes indicate at which memory locations results of the operation are to be stored for respective ones of the data elements.

In some example storage media, the instructions cause the machine to populate an array with the compressed indexes, the operation of the loop to be performed on data elements corresponding to the compressed indexes of the array.

In some example storage media, the instructions cause the machine to, when the number of indexes that has been entered into the array meets a threshold, load the data elements corresponding to an amount of the indexes of the array into a register on which the operation is to be performed.

In some example storage media, the instructions cause the machine to, when executed, cause the machine to, when the number of indexes that has been entered in the array does not meet the threshold, evaluate the condition for a second set of iterations of the loop without performing the operation on the data elements corresponding to the indexes of the array.

In some example storage media, the instructions cause the machine to shift indexes at higher order positions of the array to lower order positions of the array when the operation of the loop has been performed on the data elements corresponding to the indexes at the lower order positions of the array.

Example apparatus include a control mask generator to generate a first control mask for a first set of iterations of a loop by evaluating a condition of the loop, the control mask generator to generate the first control mask by: setting a bit of the first control mask to a first value when the condition indicates that an operation of the loop is to be executed; and setting the bit of the first control mask to a second value when the condition indicates that the operation of the loop is to be bypassed; an index loader to load indexes corresponding to the first set of iterations of the loop into a first register; a data compressor to compress the indexes in the first register according to the first control mask by: maintaining a first one of the indexes when a first bit of the first control mask associated with the first index has the first value; and discarding, before the operation is executed a second index when a second bit of the first control mask associated with the second index has the second value.

Some example apparatus further include a data loader to load data elements corresponding to indexes into a second register, wherein the data compressor is to compress the data elements in the second register according to the first control mask, and the indexes to indicate memory locations at which results of the operation are to be stored for respective ones of the data elements.

Some example apparatus further include an array populater to populate an array with the compressed indexes, the operation of the loop to be performed on data elements corresponding to the compressed indexes of the array.

Some example apparatus further include an array evaluator to determine whether a number of indexes that has been entered into the array meets a threshold, and a register loader to load data elements corresponding to an amount of the indexes of the array into a register on which the operation is to be performed when the number of indexes meets a threshold.

In some example apparatus, the control mask generator is to evaluate the condition for a second set of iterations of the loop without performing the operation on the data elements corresponding to the indexes of the array when the number of indexes that has been entered in the array does not meet the threshold.

Some example apparatus further include an array bit shifter to shift indexes at higher order positions of the array to lower order positions of the array when the operation of the loop has been performed on the data elements corresponding to the indexes at the lower order positions of the array.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. At least one non-transitory machine readable storage medium comprising instructions that, when executed, cause at least one machine to at least:
    move a first set of data elements into an array based on a control mask, the control mask indicating that an operation of a loop is to be performed on the first set of data elements, the array having a fixed size;
    load a first subset of data elements from the array into a register, the first subset of data elements corresponding to a number of data elements capable of being stored by the register;
    move a second subset of data elements from a first position within the array to a second position within the array after the first subset of data elements has been loaded into the register; and
    perform the operation of the loop on the first subset of data elements within the register.

2. The at least one non-transitory machine readable storage medium of claim 1, wherein the instructions, when executed, cause the at least one machine to generate the control mask by:
    setting a bit of the control mask to a first value when a condition of the loop indicates that the operation of the loop is to be executed; and
    setting the bit of the control mask to a second value when the condition indicates that the operation of the loop is to be bypassed.

3. The at least one non-transitory machine readable storage medium of claim 1, wherein the instructions, when executed, cause the at least one machine to move the second subset of data elements after the operation is performed on the first subset of data elements within the register.

4. The at least one non-transitory machine readable storage medium of claim 1, wherein the instructions, when executed, cause the at least one machine to:
    store a result of the operation of the loop on the first subset of data elements within the register in a memory; and
    load the second subset of data elements from the second position in the array into the register.

5. The at least one non-transitory machine readable storage medium of claim 1, wherein the instructions, when executed, cause the at least one machine to move the second subset of data elements within the array by shifting the second subset of data elements from higher order positions to lower order positions of the array.

6. The at least one non-transitory machine readable storage medium of claim 1, wherein the instructions, when executed, cause the at least one machine to move the first subset of data elements into the array by compressing the first subset of data elements based on the control mask.

* * * * *